(12) United States Patent
Lynch et al.

(10) Patent No.: US 10,562,456 B2
(45) Date of Patent: Feb. 18, 2020

(54) FRONT BUMPER SLIDE-OUT STEP

(71) Applicant: Toyota Motor Engineering & Manufacturing North America, Inc., Plano, TX (US)

(72) Inventors: Joshua S. Lynch, Dundee, MI (US); Jeffrey S. Knutsen, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/023,221

(22) Filed: Jun. 29, 2018

(65) Prior Publication Data
US 2020/0001793 A1    Jan. 2, 2020

(51) Int. Cl.
*B60R 3/02*      (2006.01)
*B60R 19/48*     (2006.01)
*B60R 9/06*      (2006.01)

(52) U.S. Cl.
CPC ............... *B60R 3/02* (2013.01); *B60R 9/06* (2013.01); *B60R 19/48* (2013.01)

(58) Field of Classification Search
CPC ... B60R 3/02; B60R 9/06; B60R 19/48; F16L 3/18
See application file for complete search history.

(56) References Cited

U.S. PATENT DOCUMENTS

| | | | | |
|---|---|---|---|---|
| 813,588 | A * | 2/1906 | Rollins | F16L 3/18 16/98 |
| 1,642,233 | A * | 9/1927 | Elliott | B60R 21/34 293/26 |
| 1,763,775 | A * | 6/1930 | Gottwald | F16L 3/18 138/113 |
| 3,097,892 | A * | 7/1963 | Newbury | E21B 7/046 248/55 |
| 3,134,619 | A * | 5/1964 | Harrison, Jr. | B60R 19/38 293/10 |
| 3,159,242 | A * | 12/1964 | James | B60R 3/007 182/92 |
| 3,181,924 | A * | 5/1965 | Guth | A47L 15/50 312/311 |
| 3,341,223 | A * | 9/1967 | Wampfler | B60R 3/02 182/88 |

(Continued)

FOREIGN PATENT DOCUMENTS

| | | | | |
|---|---|---|---|---|
| DE | 102004022835 A1 * | 12/2005 | | B60R 5/041 |
| GB | 2559426 A * | 8/2018 | | B60R 3/02 |

*Primary Examiner* — Jacob B Meyer
(74) *Attorney, Agent, or Firm* — Christopher G. Darrow; Darrow Mustafa PC

(57) ABSTRACT

An extendable and retractable step platform assembly is provided for a front of a vehicle to afford a user with a better view and reach for accessing an engine compartment. The step platform assembly includes a guide rail system coupled to a front frame of the vehicle. A step platform is coupled to the guide rail system. The step platform provides a substantially planar surface configured to support a load for an extended time. The step platform moves in a horizontal direction between a first position that is retracted behind a front bumper of the vehicle, and a second position that is extended beyond the front bumper of the vehicle.

16 Claims, 7 Drawing Sheets

(56) References Cited

U.S. PATENT DOCUMENTS

| | | | | |
|---|---|---|---|---|
| 3,501,190 A * | 3/1970 | McCrea | B60P 3/36 224/42.3 |
| 3,580,613 A * | 5/1971 | Northrop | B60R 3/02 280/500 |
| 3,584,925 A * | 6/1971 | Himelreich | A47B 88/906 312/334.19 |
| 3,682,360 A * | 8/1972 | Fletcher | B60R 19/48 224/491 |
| 3,847,427 A * | 11/1974 | Eshelman | B60R 19/20 293/19 |
| 3,853,369 A * | 12/1974 | Holden | B60R 3/02 296/62 |
| 3,992,047 A * | 11/1976 | Barenyi | B60R 19/14 293/9 |
| 4,057,125 A * | 11/1977 | Kroft | B60R 3/007 182/91 |
| 4,096,922 A * | 6/1978 | Fisher | E04G 3/34 182/142 |
| 4,108,458 A * | 8/1978 | Owens | B60R 3/02 105/449 |
| 4,159,122 A * | 6/1979 | Stevens | B60R 3/02 108/134 |
| 4,194,754 A * | 3/1980 | Hightower | B60R 3/02 280/166 |
| 4,228,936 A * | 10/1980 | Rife | B60R 11/06 224/42.13 |
| 4,274,648 A * | 6/1981 | Robins | B60R 3/02 182/91 |
| 4,312,620 A * | 1/1982 | Muschalek, Jr. | B62D 43/04 224/42.12 |
| 4,438,875 A * | 3/1984 | Fritsch | B60R 9/06 224/500 |
| 4,605,098 A * | 8/1986 | Leuty | B60R 3/007 182/92 |
| 4,615,449 A * | 10/1986 | Naito | A47B 53/02 211/162 |
| 4,620,609 A * | 11/1986 | Elsten | B60R 3/007 182/92 |
| 4,676,415 A * | 6/1987 | Kennedy | B62D 43/04 224/42.21 |
| 4,750,753 A * | 6/1988 | Dezern | B60R 3/02 224/497 |
| 4,753,447 A * | 6/1988 | Hall | B60R 3/007 182/127 |
| 4,785,910 A * | 11/1988 | Tonkovich | B60R 3/007 182/61 |
| 4,825,975 A * | 5/1989 | Symes | B60R 3/007 182/150 |
| 4,869,520 A * | 9/1989 | Cole | B60R 3/007 280/164.1 |
| 4,911,264 A * | 3/1990 | McCafferty | B25H 5/00 182/150 |
| 5,195,609 A * | 3/1993 | Ham | B60R 3/02 182/90 |
| 5,513,866 A * | 5/1996 | Sisson | B60R 3/02 105/449 |
| 5,860,786 A | 1/1999 | Aubrecht | |
| 6,044,239 A * | 3/2000 | Russell | G03G 15/00 312/330.1 |
| 6,264,586 B1 * | 7/2001 | Webber | A63B 21/078 482/104 |
| 6,364,256 B1 * | 4/2002 | Neider | F16L 3/18 248/55 |
| 6,394,512 B1 * | 5/2002 | Schuster | B60R 19/12 293/118 |
| 6,474,715 B2 * | 11/2002 | Fukushima | B60R 5/04 296/37.1 |
| 6,502,791 B2 * | 1/2003 | Parker | F16L 3/18 248/405 |
| 6,540,275 B1 * | 4/2003 | Iwamoto | B60R 19/12 293/109 |
| 6,575,509 B1 * | 6/2003 | Golden | B60R 9/06 293/106 |
| 6,592,093 B2 * | 7/2003 | Valentz | F16L 3/00 248/346.01 |
| 6,612,595 B1 * | 9/2003 | Storer | B60R 3/00 280/163 |
| 6,726,260 B1 * | 4/2004 | Wang | B60R 19/12 293/117 |
| 6,764,118 B2 * | 7/2004 | DePottey | B60R 19/40 293/118 |
| 6,773,044 B2 * | 8/2004 | Schambre | B60R 19/40 293/10 |
| 6,810,979 B2 * | 11/2004 | Johansson | B60R 3/02 180/69.21 |
| 6,834,899 B2 * | 12/2004 | Lindsey | B60R 19/483 293/118 |
| 6,926,322 B2 * | 8/2005 | Browne | B60R 19/40 293/114 |
| 6,968,931 B2 * | 11/2005 | Huisman | B60G 3/01 188/322.16 |
| 7,073,420 B2 * | 7/2006 | Kuo | B23D 17/06 83/112 |
| 7,281,745 B1 * | 10/2007 | Meinke | B60P 3/40 296/26.08 |
| 7,434,825 B2 * | 10/2008 | Williams | B60R 3/02 280/163 |
| 7,878,709 B2 * | 2/2011 | Herrmann | A61B 6/4441 378/194 |
| 8,245,996 B1 | 8/2012 | Ciabaszewski | |
| 8,302,829 B2 * | 11/2012 | Lee | B60R 9/10 224/488 |
| 8,678,461 B2 * | 3/2014 | Cha | B60R 19/48 224/489 |
| 8,696,005 B2 * | 4/2014 | Kim | B60R 19/48 280/163 |
| 8,789,865 B2 * | 7/2014 | Cha | B60R 19/48 293/106 |
| 8,950,800 B1 * | 2/2015 | Farooq | B60R 21/34 296/187.04 |
| 9,102,290 B1 * | 8/2015 | Cuddihy | B60R 19/023 |
| 9,174,584 B1 * | 11/2015 | Cha | B60R 9/10 |
| 9,346,405 B2 | 5/2016 | Leitner et al. | |
| 9,403,487 B1 * | 8/2016 | Diehl | B62D 25/12 |
| 9,446,726 B2 * | 9/2016 | Cuddihy | B60R 19/023 |
| 9,526,665 B2 * | 12/2016 | Rawls-Meehan | A61G 7/0514 |
| 9,533,620 B1 * | 1/2017 | Rees | B60D 1/06 |
| 9,550,649 B2 * | 1/2017 | Zink | B65H 51/10 |
| 9,739,078 B2 * | 8/2017 | Diehl | B62D 25/12 |
| 10,259,126 B1 * | 4/2019 | Kapczynski | B25J 19/0025 |
| 10,272,861 B2 * | 4/2019 | Wymore | B60R 19/48 |
| 2004/0051428 A1 * | 3/2004 | Bartloff | A47L 15/507 312/333 |
| 2004/0113025 A1 * | 6/2004 | Sargent | F16L 3/02 248/49 |
| 2004/0130116 A1 * | 7/2004 | Glanert | B60R 3/007 280/163 |
| 2005/0140159 A1 * | 6/2005 | Barber | B60P 3/14 296/37.6 |
| 2007/0090142 A1 * | 4/2007 | Chuang | B60P 3/07 224/496 |
| 2010/0001029 A1 * | 1/2010 | Tai | B60R 5/041 224/499 |
| 2010/0150317 A1 * | 6/2010 | Herrmann | A61B 6/4441 378/194 |
| 2013/0088034 A1 * | 4/2013 | Cha | B60R 19/48 296/37.1 |
| 2013/0088035 A1 * | 4/2013 | Cha | B60R 19/48 296/37.1 |
| 2013/0154229 A1 * | 6/2013 | Kim | B60R 3/02 280/163 |
| 2014/0339375 A1 * | 11/2014 | Birch | F16L 3/18 248/49 |
| 2016/0137134 A1 | 5/2016 | Nania | |
| 2016/0243992 A1 * | 8/2016 | Diehl | B62D 25/12 |
| 2016/0305171 A1 * | 10/2016 | Diehl | B62D 25/12 |
| 2017/0298675 A1 | 10/2017 | Dimig et al. | |

(56) References Cited

U.S. PATENT DOCUMENTS

2018/0009390 A1* 1/2018 Cha .......................... B60R 9/06
2018/0072254 A1* 3/2018 Wymore ................. B60R 19/48
2018/0229661 A1* 8/2018 Exline ...................... B60R 3/02

* cited by examiner

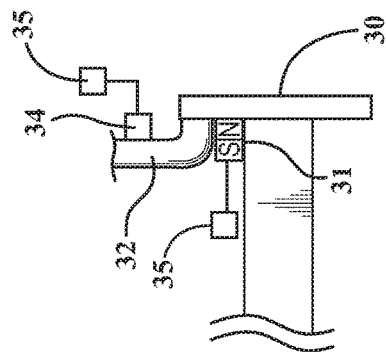
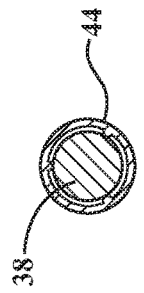
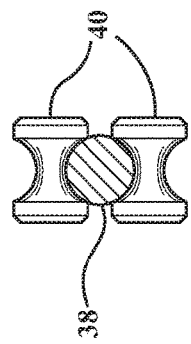
FIG. 3B
FIG. 4B
FIG. 5B
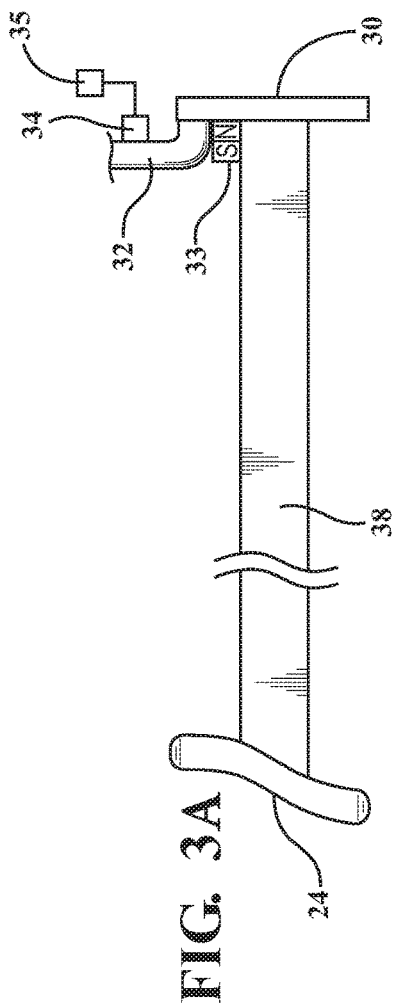
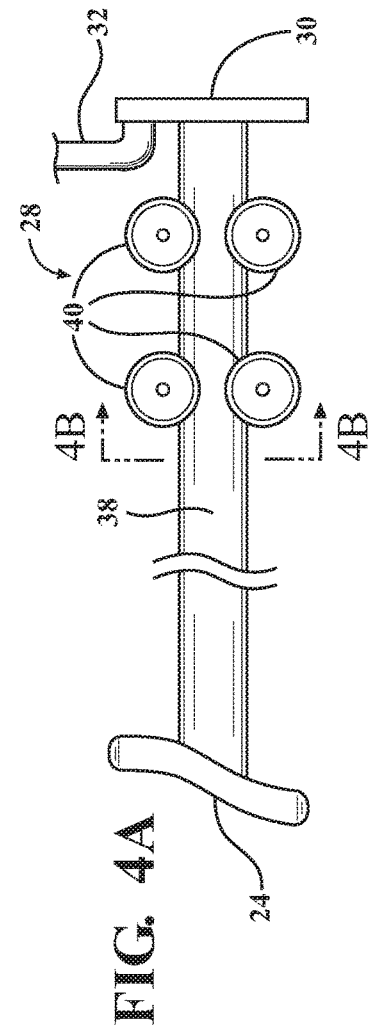
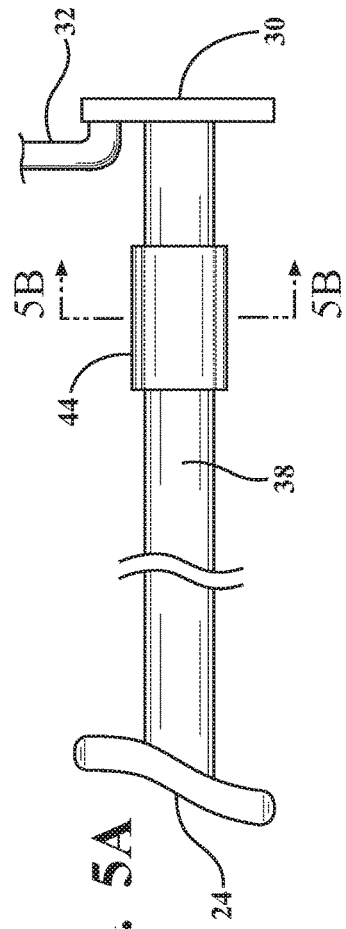
FIG. 3A
FIG. 4A
FIG. 5A

FRONT BUMPER SLIDE-OUT STEP

TECHNICAL FIELD

The present disclosure generally relates to a slide-out support apparatus located in a front bumper of a vehicle, and more particularly, to a stable step to provide a user with a better view and reach for accessing the engine compartment.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicle size can create a difficulty for owners in accessing the engine compartment. For example, larger vehicles are high off the ground, making it difficult to reach inside and access all areas of the engine compartment. Additionally, some components in the engine compartment require torque to remove or tighten. Step ladders may be used, but are prone to tipping when a user's center of gravity is not directly over the ladder, which may happen when reaching back into the engine compartment.

Accordingly, safety considerations create a need for an alternative way to access the engine compartment.

SUMMARY

This section provides a general summary of the disclosure, and is not a comprehensive disclosure of its full scope or all of its features.

In various aspects, the present teachings provide a step platform assembly for the front of a vehicle. The step platform assembly includes a guide rail system that is coupled to the front frame of the vehicle. A step platform is coupled to the guide rail system. The step platform includes a substantially planar surface configured to support a load, for example, a user or mechanic. The step platform moves with respect to the guide rail system in a horizontal direction between a first position that is retracted behind a front of the vehicle, and a second position that is extended beyond the front of the vehicle.

In other aspects, the present teachings provide a vehicle bumper assembly having an extendable step platform. The vehicle bumper assembly includes an impact absorbing component, a guide rail system coupled to a front frame of a vehicle, and a step platform coupled to the guide rail system. The step platform moves in a horizontal direction between a first position that is retracted behind a front of the vehicle, and a second position that is extended a distance from a center section of the front of the vehicle.

In still other aspects, the present teachings provide a vehicle having an extendable step platform providing improved access for maintenance. The vehicle comprises a vehicle frame, an engine compartment, an engine disposed in the engine compartment, and a vehicle bumper assembly. The vehicle bumper assembly may have a guide rail system including a pair of guide rods and an extendable step platform configured to move in a horizontal direction between a first position adjacent the engine, and a second position extending from a front of the vehicle. The step platform is configured to support a load of a user for performing maintenance on the engine in the engine compartment. A movement-limiting system may be provided, including a stopper component coupled to each guide rod that contacts a receiver component when the step platform extends to the second position.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3A is a partial side plan view of an exemplary movement limiting system according to various aspects;

FIG. 3B is a magnified partial side plan view of the movement limiting system of FIG. 3A that shows various details including an electromagnet connected to a controller;

FIG. 4A is a partial side plan view of a first exemplary guide-rail system including a set of beveled wheels and a guide rod constrained within the wheels;

FIG. 4B is a cross-sectional view of the guide rod taken along the line 4B-4B and constrained within the beveled wheels;

FIG. 5A is a partial side plan view of a second exemplary guide-rail system including a linear bushing with a guide rod constrained within the linear bushing;

FIG. 5B is a cross-sectional view of the guide rod taken along the line 5B-5B and constrained within the linear bushing;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a slide-out step attached to a vehicle 20 which, in various aspects, provides a user with a better view and reach for maintaining the engine compartment 21. The step may be integrated into a front bumper assembly 22 of the vehicle 20, providing convenience to users who need to view the engine compartment 21, while not altering the aesthetic appeal of the vehicle 20. It is most useful for larger vehicles with large engine compartments, but the system may be integrated on different vehicle sizes to accommodate for different circumstances.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

Figure 1A:
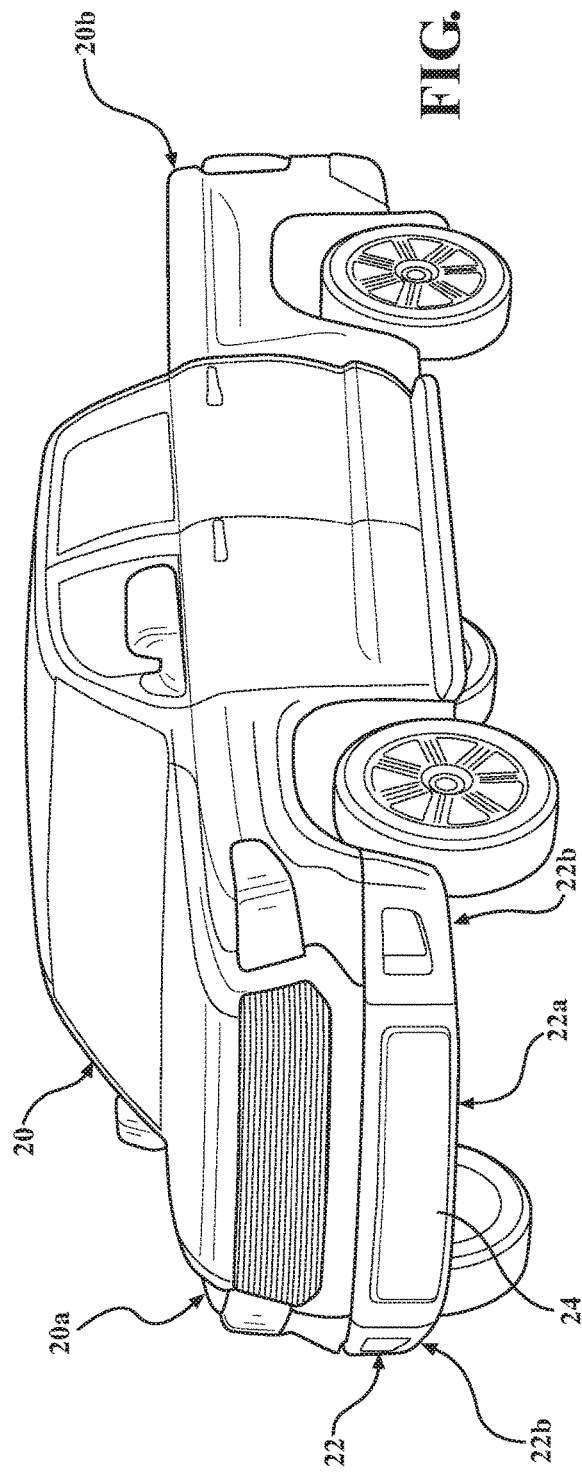
FIG. 1A is a perspective view of an exemplary vehicle showing a first position, or retracted position, of a step platform according to various aspects of the present technology.
Figure 1B:
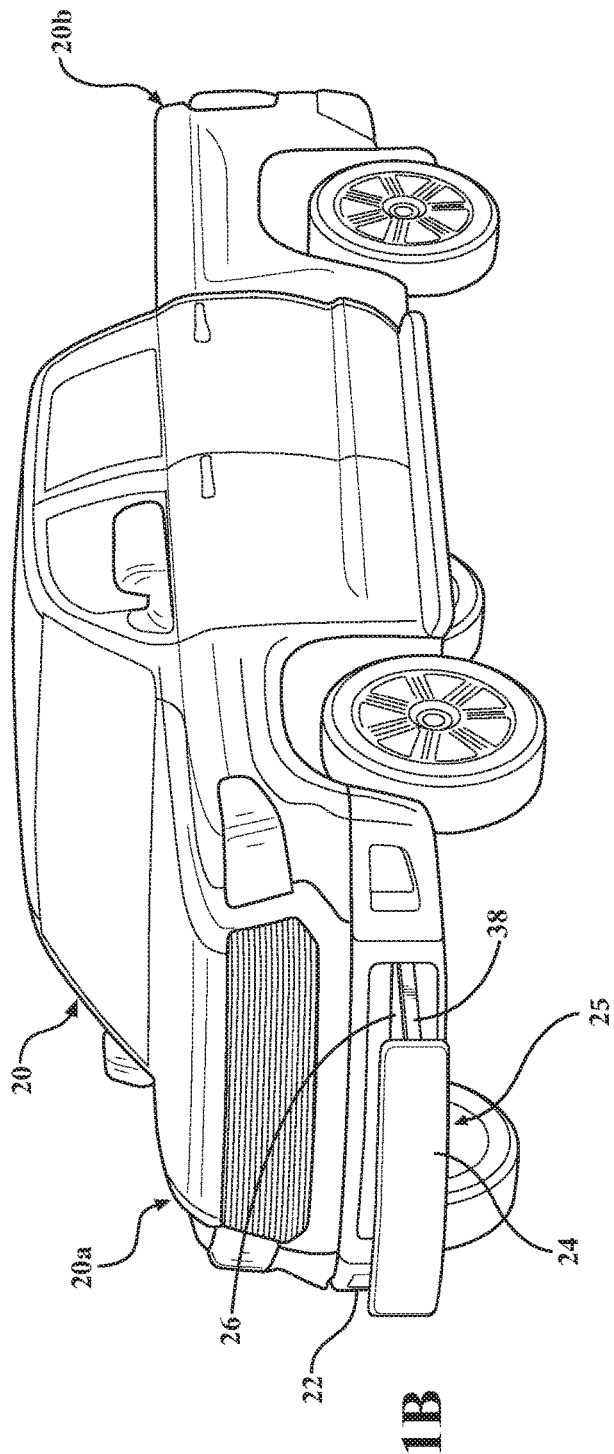
FIG. 1B is a perspective view of the vehicle of FIG. 1A showing a second position, or extended position, of the step platform.

FIGS. 1A-1B illustrate an exemplary vehicle 20 as a truck having a front end 20a that includes a passenger cabin, and a rear end 20b that defines a truck bed with an open storage area. As shown in FIG. 1A, the vehicle 20 includes a front bumper assembly 22 with a step platform assembly 25 in a first position, or a retracted position, according to various aspects of the present technology. The front bumper assembly 22 generally extends along the width of the vehicle 20 and may be defined as having a center region 22a with a front face 24 and two opposing side regions 22b. The center region 22a and side regions 22b may be of various dimensions and may include impact absorbing members typical of vehicle bumpers that provide safety protection for impact or collisions. In one example, the front face 24 may include an impact absorbing member. In the first position, the step platform assembly 25 is substantially hidden from view and may be adjacent to an engine compartment 21 of the vehicle 20, for example under an engine.

Figure 7A:
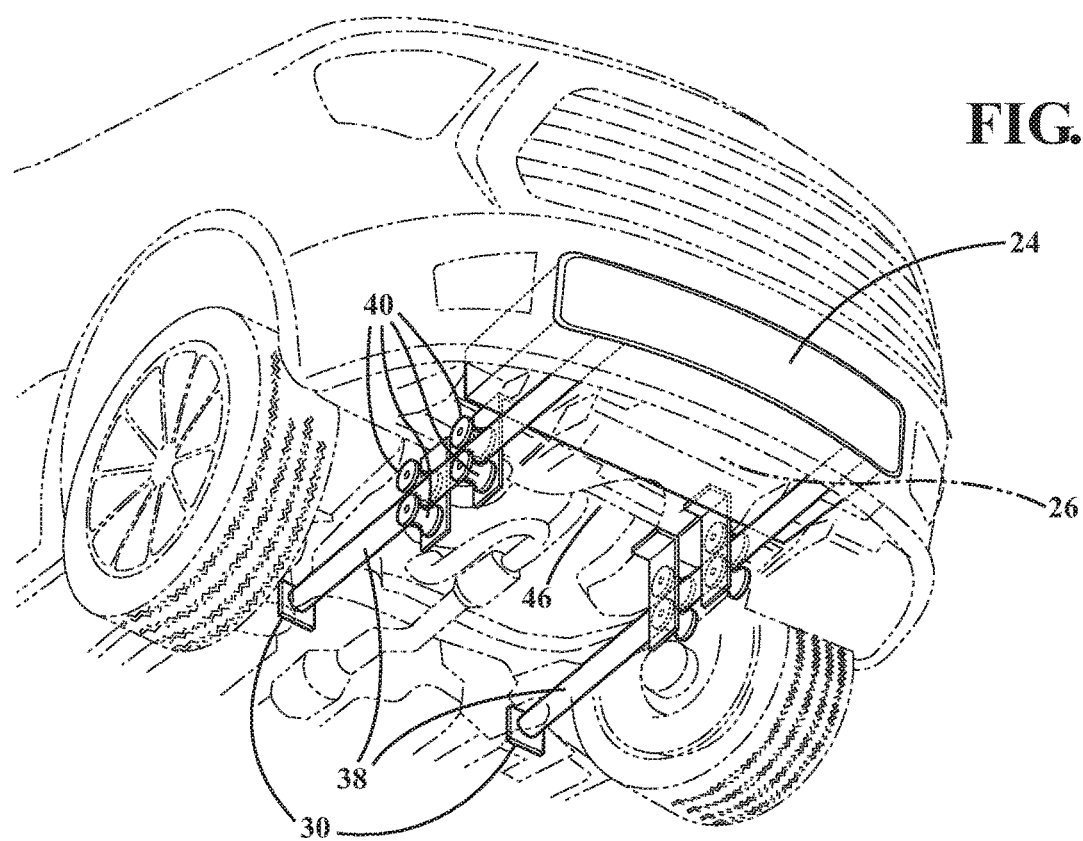
FIG. 7A is a perspective view of an underside of the front of the vehicle of FIG. 1A, illustrating the guide-rail system in the first position and movably coupled to the frame, configured with opposing sets of beveled wheels and guide rods.

FIG. 1B illustrates the vehicle 20 of FIG. 1A with the step platform assembly 25 in a second position, or extended position, according to various aspects of the present technology. The step platform assembly 25 includes a step platform 26 that generally defines a substantially planar surface configured to support a load, for example, a user or mechanic, and moves in a horizontal direction between the first and second positions. The planar surface may optionally be provided with a grip enhancing feature, such as a textured surface, anti-skid strip, traction treads, or the like. The step platform 26 may be coupled to a guide-rail assembly 28. In one aspect, the sides of the step platform 26 are coupled with the guide-rail assembly 28 as will be discussed below. The guide-rail assembly 28 may be movably coupled to a portion of a front frame 46 of the vehicle 20. In certain aspects, the guide-rail assembly 28 may be coupled directly to the front frame 46. In other aspects, the guide-rail assembly may be coupled indirectly to the front frame 46, for example, with brackets or the like (FIG. 7A). As shown in various figures, the front face 24 of the step platform assembly 25 may be shaped to match or complement a shape or design of the front fascia of the vehicle 20.

Figure 2A:
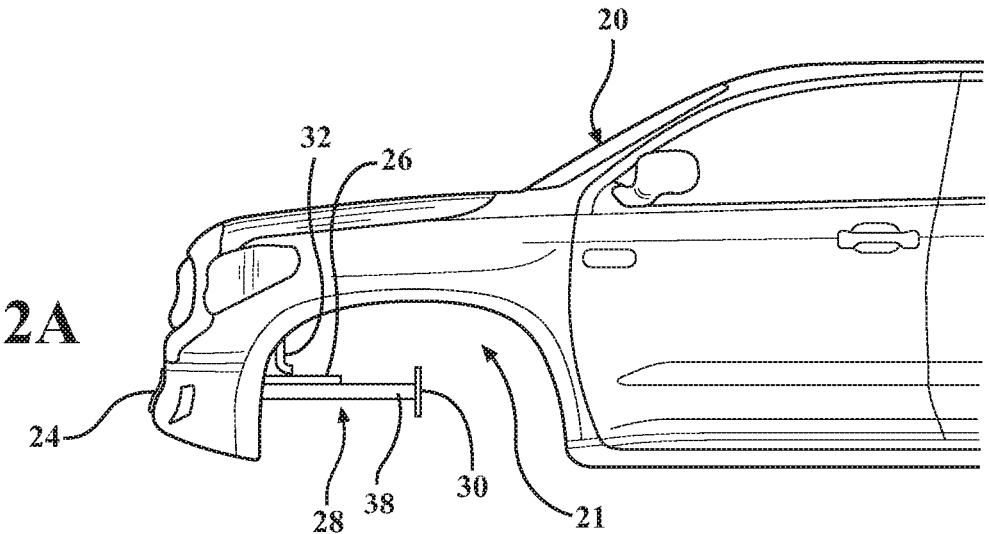
FIG. 2A is a partial side plan view of the vehicle of FIG. 1A and shows various details of the step platform in the first position.
Figure 2B:
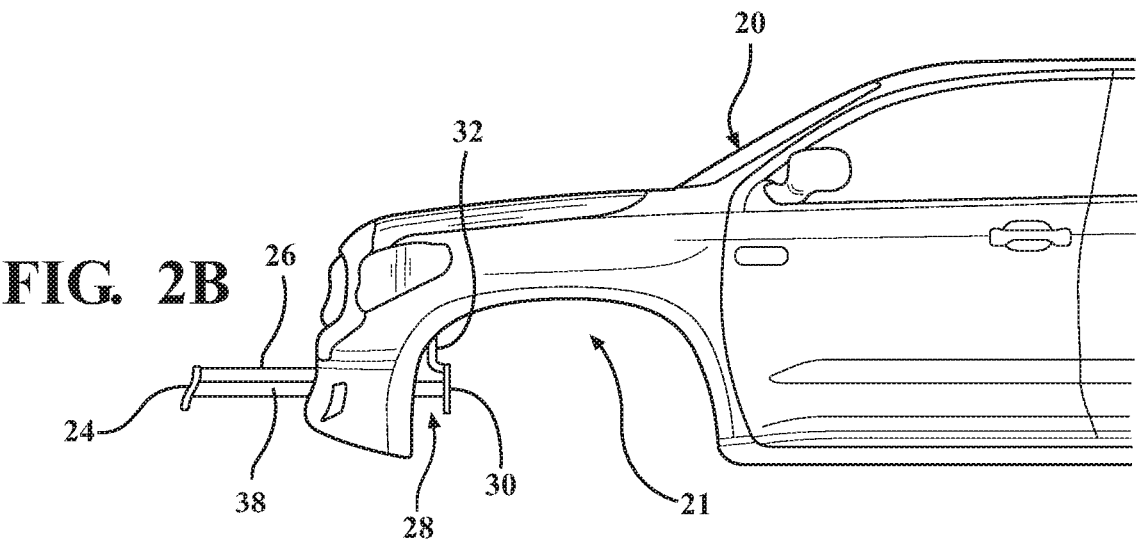
FIG. 2B is a partial side plan view of the vehicle of FIG. 1B and shows various details of the step platform in the second position.

FIG. 2A illustrates the vehicle 20 of FIG. 1A with the step platform assembly 25 in the first position. Various aspects of the guide-rail assembly 28 include stopper components 30 coupled to opposing guide rods 38, and receiver components 32 coupled to the vehicle 20. The sizes, shapes, and specific locations of the stopper components 30 and receiver components 32 may vary as desired. FIG. 2B illustrates the vehicle 20 of FIG. 2A with the step platform assembly 25 in the second position. The stopper components 30 and receiver components 32 may be configured such that when the step platform assembly 25 is in the second position, the stopper components 30 may physically contact the receiver components 32, thereby limiting the extension of the step platform assembly 25.

Figure 2C:
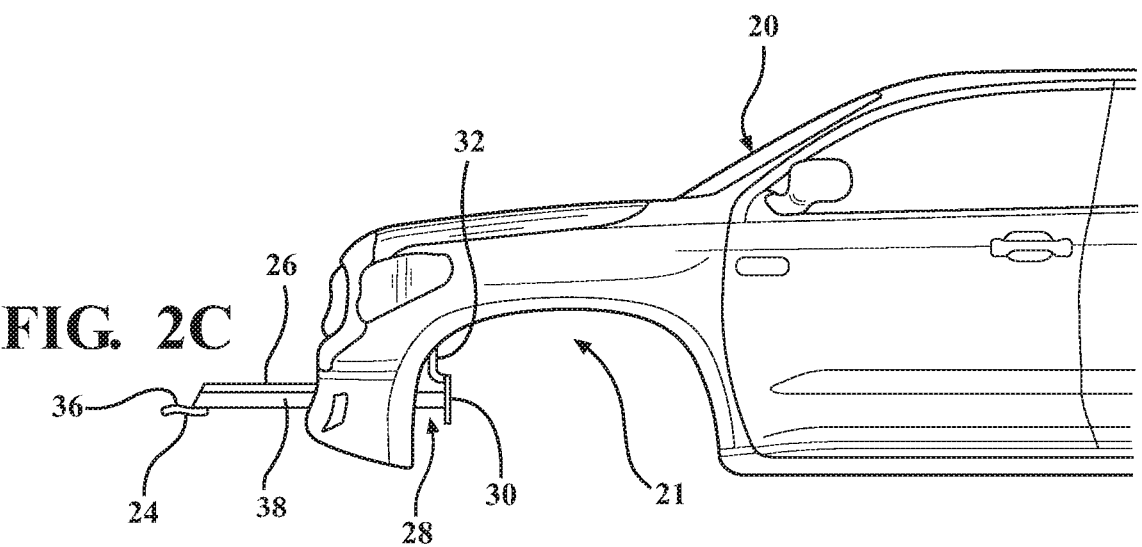
FIG. 2C is a partial plan side plan view of the vehicle of FIG. 1B and shows details of a step platform with a folding auxiliary step platform engaged.

FIG. 2C illustrates various aspects of the present technology, including a step platform assembly 25 with an optional folding auxiliary step platform 36. The folding auxiliary step platform 36 may be movably coupled to the step platform assembly 25 and may be offset a vertical distance from a height of the step platform 26. As used herein, the term "movably coupled" should be construed to have a broad meaning, with non-limiting examples of rotational movement, pivoting movement, hinged movement, sliding movement, etc.

The folding auxiliary step platform 36 allows for a user to have easier access to the step platform 26. The folding auxiliary step platform 36 also defines a substantially planar surface and is configured to support a load. It should be understood that while the figures illustrate the front face 24 of the bumper 22 being rotated/folded from a substantially vertical position (FIG. 2B) to a substantially horizontal position (FIG. 2C), in other aspects, the folding auxiliary step platform 36 may be coupled to an underside of the step platform assembly 25, and either fold out, about 180 degrees, or slide out.

In certain aspects, the front face 24 may be configured to fold down when the step platform assembly 25 is in the first position, retracted within the vehicle. In this regard, the front face 24 may rotate downward about a pivot point, exposing a small planar surface platform to stand on. The depth of the step could also extend inward, under the grille area of the vehicle 20, recessed for a foot and allowing a user to step closer to the engine and reach within the engine compartment 21.

FIG. 3A illustrates a partial side plan view of an exemplary movement system useful for providing movement of the guide rail assembly 28 between the positions as shown in FIGS. 2A and 2B. In various aspects, the movement system includes a magnet 33 that may be coupled to at least one of the stopper components 30 and receiver components 32. The magnet 33 may be a conventional permanent magnet, such as a rare earth magnet, that allows for the guide-rail assembly 28 to be maintained in the second position (FIG. 2B), preventing the step platform assembly from moving towards the first position. This aspect would require a force of a certain threshold in order to close the step platform assembly 25. In another embodiment, the magnet 33 may be positioned such that the step platform assembly may be maintained in the first position. FIG. 3B provides various aspects of the magnet 33 provided as an electromagnet 31 connected to a controller 35 such that the electromagnet 31 may be activated and deactivated to selectively maintain the step platform assembly. Various aspects provide a sensor 34 that may determine if the step platform assembly 25 is in the first or second position. Further, the sensor 34 may be connected to the controller 35, wherein the controller 35 may be connected to a vehicle control system that may be configured to prevent the vehicle 20 from shifting or otherwise prevent or limit vehicle movement when the sensor 34 detects the step platform assembly 25 is not in the first position. The sensor 34 may be positioned adjacent the guide-rail assembly 28. The sensor 34 may be configured to work with the vehicle control system to provide at least one of a visual and audio notification when the step platform 26 is not detected in the first position. As used herein, the term "sensor" generally means any device, component, and/or system that can detect and/or sense something and should be construed to have a broad meaning, with non-limiting examples of an ultrasonic sensor, a position sensor, a camera, a touch sensor, etc.

FIG. 4A illustrates various aspects of the guide-rail assembly 28 that include at least one pair of beveled wheels 40 ultimately coupled to opposing sides of a front frame 46 of the vehicle 20 (FIG. 7A), and provided with a guide rod 38 that is constrained within the respective pair(s) of wheels 40. Each guide rod 38 may be coupled to opposing sides of the step platform 26, allowing for coordinated movement between the first position and the second position. FIG. 4A shows the guide-rail assembly 28 in the second position, with the stopper component 30 contacting the receiver component 32. The beveled wheels 40 may be positioned in a manner illustrated in FIG. 4B, which is a cross-sectional view of FIG. 4A taken along the line 4B-4B. The guide rod 38 should be configured to be made of a material that resists bending due to the load on the step platform 26.

FIG. 5A illustrates various aspects of the guide-rail assembly 28 that include at least one pair of linear bushings 44, wherein a guide rod 38 is movably coupled to each respective linear bushing 44. Each guide rod 38 may be coupled to opposing sides of the step platform 26, allowing for coordinated movement between the first position and the second position. FIG. 5A shows the guide-rail assembly 28 in the second position, with the stopper component 30 contacting the receiver component 32. The guide rod 38 may be positioned in a way similar to that shown in FIG. 5B, which is a cross-sectional view of FIG. 5A taken along the line 5B-5B. The guide rod 38 should be configured to be made of a material that resists bending due to the load on the step platform 26. Each linear bushing 44 may include at least one row of ball bearings. The row of ball bearings may be positioned parallel to the guide rod 38.

Figure 6A:
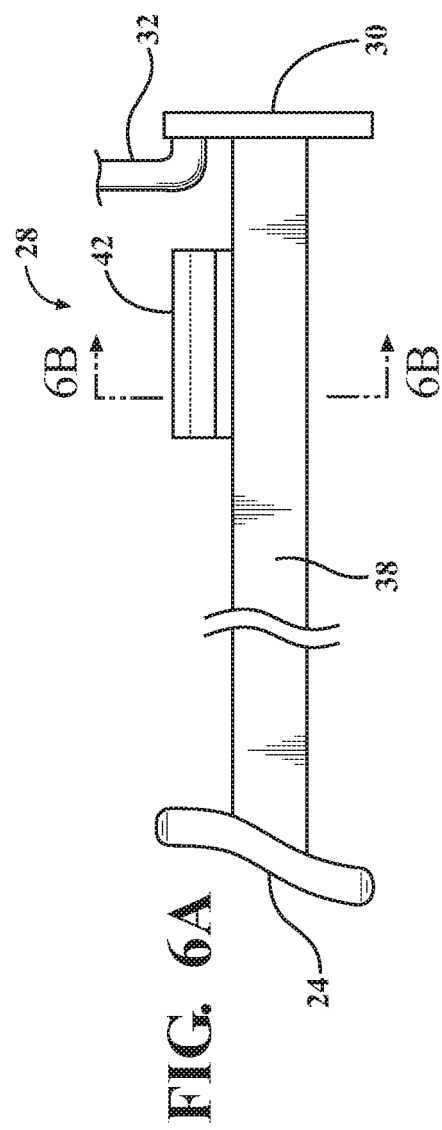
FIG. 6A is a partial side plan view of a third exemplary guide-rail system including a linear action guide with a guide rod movably coupled to the linear action guide.
Figure 6B:
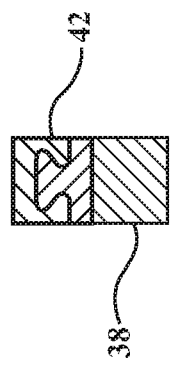
FIG. 6B is a cross-sectional view of the guide rod taken along the line 6B-6B and constrained within the linear action guide.
Figure 6C:
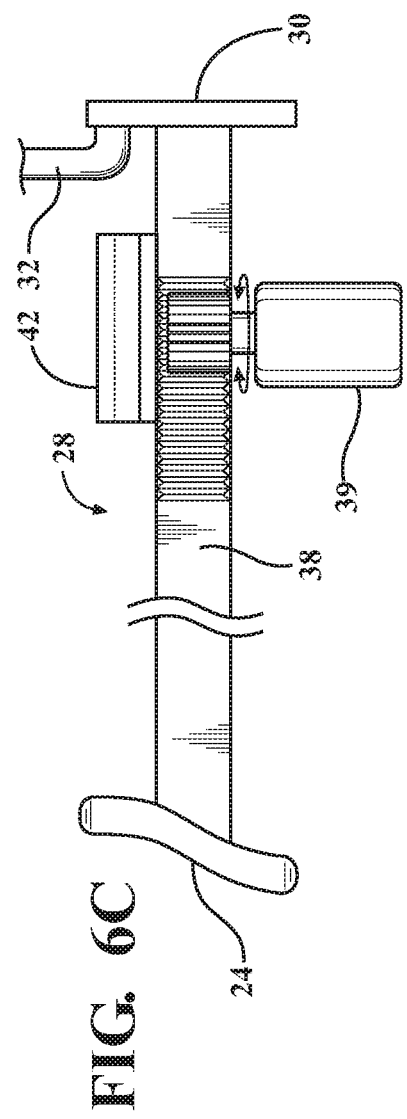
FIG. 6C is a partial side plan view of the exemplary guide-rail system of FIG. 6A including a motor coupled to the guide rod.

FIG. 6A illustrates various aspects of the guide-rail assembly 28 that include a pair of linear action guides 42 coupled to opposing sides of the front frame 46 of the vehicle 20, wherein a guide rod 38 is movably coupled to each respective linear action guide 42. Each guide rod 38 may be coupled to opposing sides of the step platform 26, allowing for coordinated movement between the first position and the second position. FIG. 6A shows the guide-rail assembly 28 in the second position, with the stopper component 30 contacting the receiver component 32. The guide rod 38 may be positioned in a way similar to that shown in FIG. 6B, which is a cross-sectional view of FIG. 6A taken along the line 6B-6B. Each guide rod 38 should be configured to be made of a material that resists bending due to the load on the step platform 26. As shown in FIG. 6C, various aspects of the present technology may provide a motor 39 configured to be movably coupled to the guide rod 38, to selectively control the extension and retraction of the guide-rail assembly 28. FIG. 6C illustrates a rack and pinion configuration that controls movement of the guide rods 38, but the motor 39 may control the guide-rail assembly 28 position in alternative configurations, with non-limiting examples of an auger and screw configuration, a collection of gears, a belt movably coupled to the motor and the guide rods, etc. The motor 39 may be controlled through the vehicle control system, with various actuation means. The motor 39 may be in communication with various sensor(s) 34 and controller(s) 35.

FIG. 7A is a perspective view of an underside of the front of the vehicle 20 of FIG. 1A, illustrating the guide-rail system 28 in the first position and movably coupled to the frame, configured with opposing sets of beveled wheels and guide rods. Various aspects of the exemplary guide-rail assembly 28 provide four pairs of beveled wheels 40, with two pairs (a set) positioned in a manner similar to FIG. 4A, and the remaining pair positioned symmetrically about an axis parallel to the movement of the step platform 26. Further, various aspects provide a guide rod 38 constrained within each set of wheels 40. The guide-rail assembly 28 may be directly or indirectly coupled to a front frame 46 of the vehicle 20. FIG. 7A illustrates the beveled wheels 40 configuration indirectly mounted to the front frame 46 by multiple L-brackets. Other embodiments may include using pins or bolts, and U-type brackets to couple the wheels, but are not limited to these configurations. For example, the linear bushing 44 as shown in FIGS. 5A-5B may be coupled by brackets, pins, or another means. The linear action guide 42 as shown in FIGS. 6A-6B may be welded to the front frame, or coupled by another means, etc.

Figure 7B:
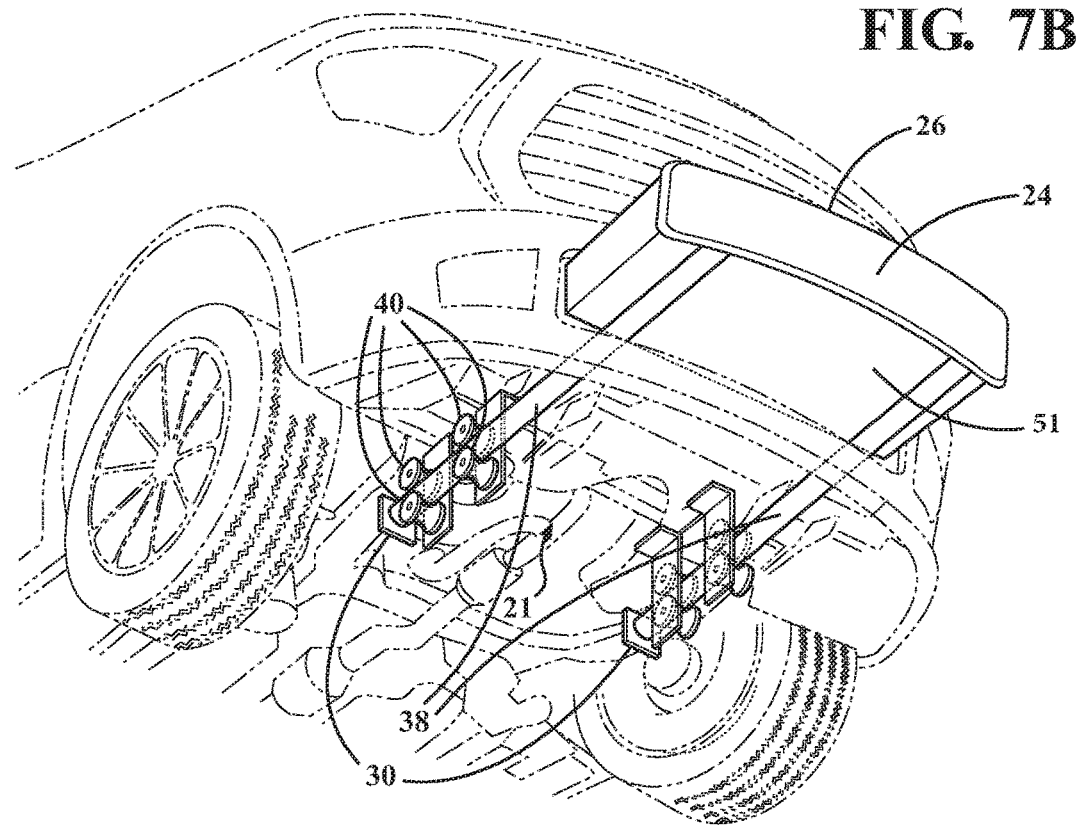
FIG. 7B is a perspective view similar to FIG. 7A, with the guide-rail system in the second position.

FIG. 7B illustrates the exemplary guide-rail assembly 28 from FIG. 7A in the second position. The guide-rail assembly 28 may have a constrained movement between the first and second positions, limited to a distance of the length of the step platform 26. A constrained movement eliminates the possibility of gaps between the step platform 26 and the vehicle 20.

Figure 8A:
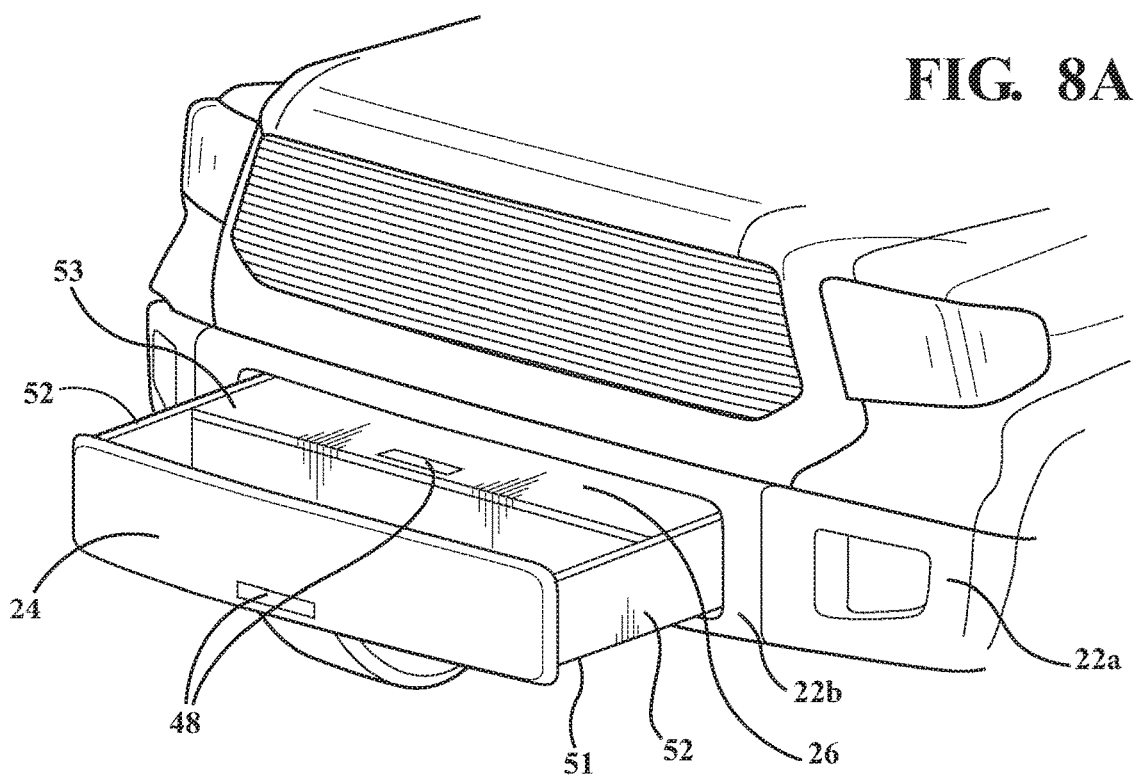
FIG. 8A is a perspective view of the step platform in the second position and includes a small storage compartment and a folding auxiliary step platform.
Figure 8B:
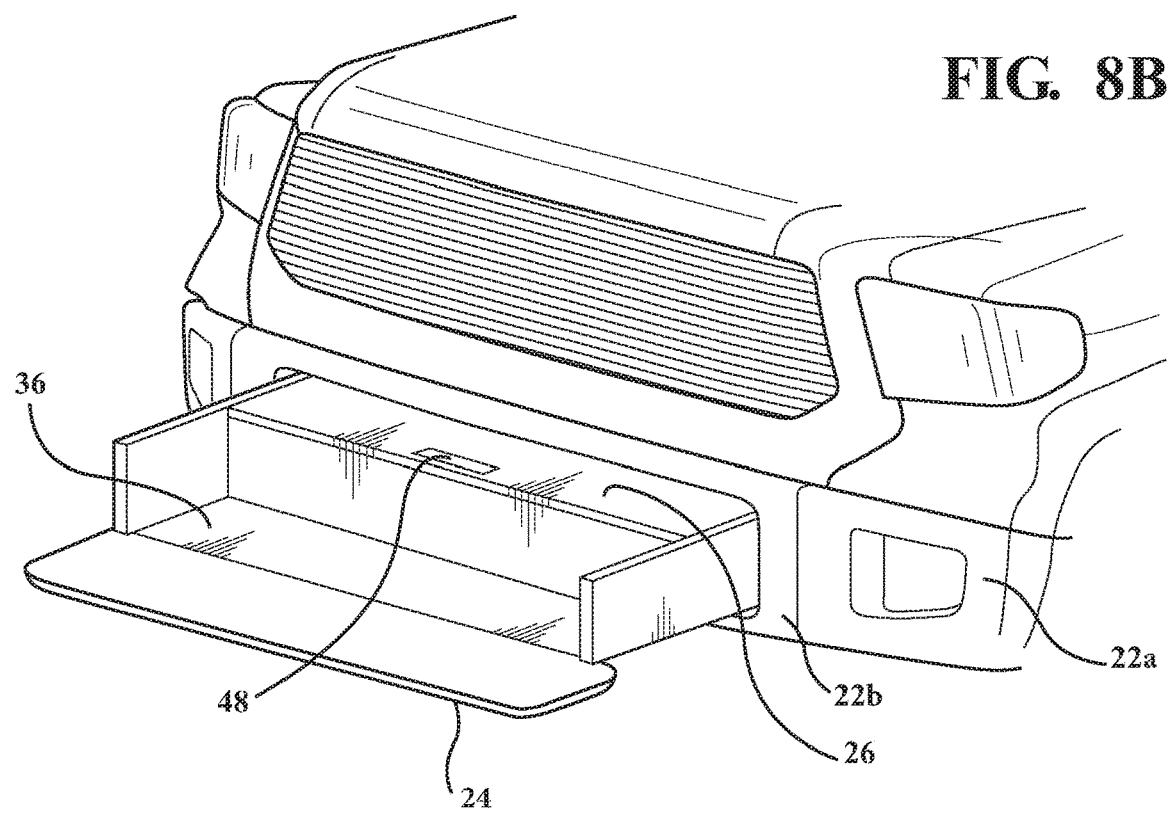
FIG. 8B is a perspective view similar to FIG. 8A, with the folding auxiliary step platform folded downward, revealing an auxiliary step platform.

FIG. 8A illustrates the step platform assembly 25 in the second position. The guide rails are not shown for clarity purposes. Various aspects may provide an optional storage compartment 50 that may be bounded by side portions 52, a lower portion 51, and an upper portion 53, with the upper portion 53 configured to support a load, similar to the step platform 26. Further, various aspects provide an auxiliary step platform 36, which may be more accessible by including a folding front face 24, that allows for easier access to the step platforms 26, 36. For example, FIG. 8B illustrates the folding auxiliary step platform 36, similar to FIG. 2C. The folding auxiliary step platform 36 is movably coupled to the step platform assembly, and may be coupled by a hinge. Various aspects of FIGS. 8A and 8B provide a handle 48 located on the front face 24 of the step platform 26. The handle 48 provides a place for the user to grip the step platform 26 to move the step platform assembly 25 between the first position and second position. A handle 48 may be located on the upper portion 53 of the storage compartment 50 to provide the user a place to grip the upper portion 53 and open the storage compartment 50. The upper portion 53 may be movably coupled to the step platform assembly 25. The movable coupling may be, but is not limited to, a slide or hinge to rotate the upper portion, etc. The upper portion 53 may be uncoupled from the step platform assembly 25 so that it may be removed to access the storage compartment 50.

Figure 8C:
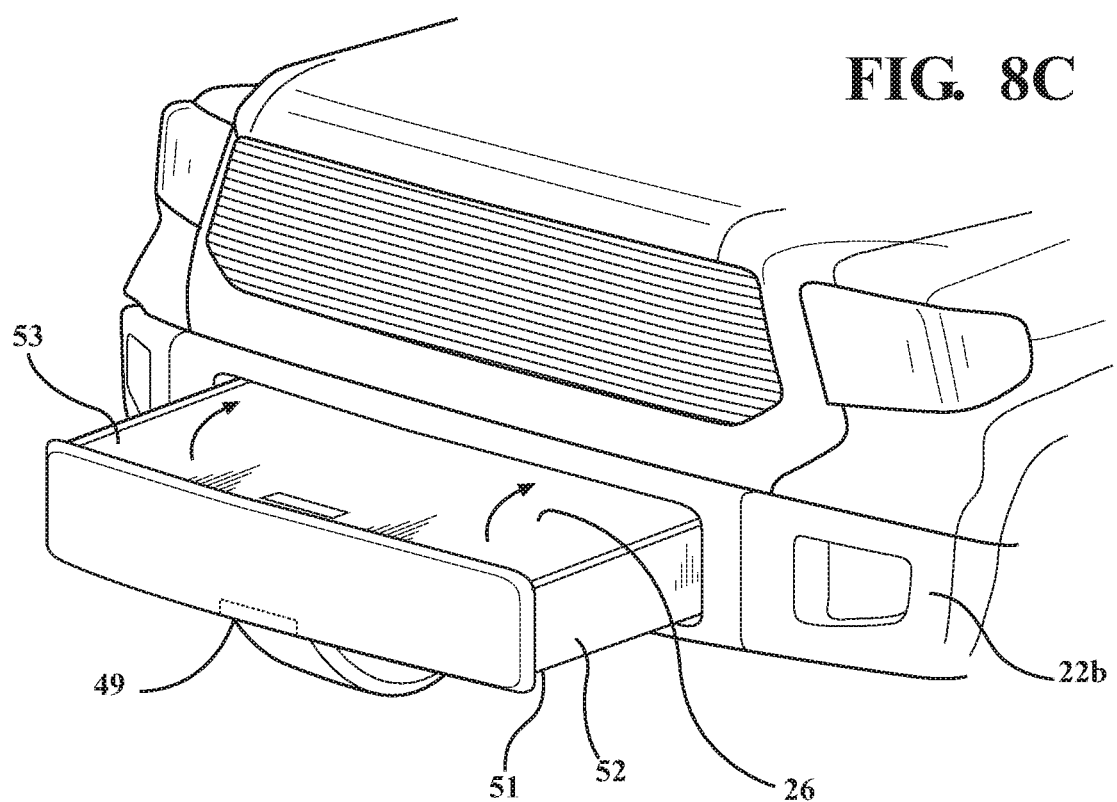
FIG. 8C is a perspective view of the step platform in the second position comprising a step platform configured to include a large storage compartment underneath.
Figure 8D:
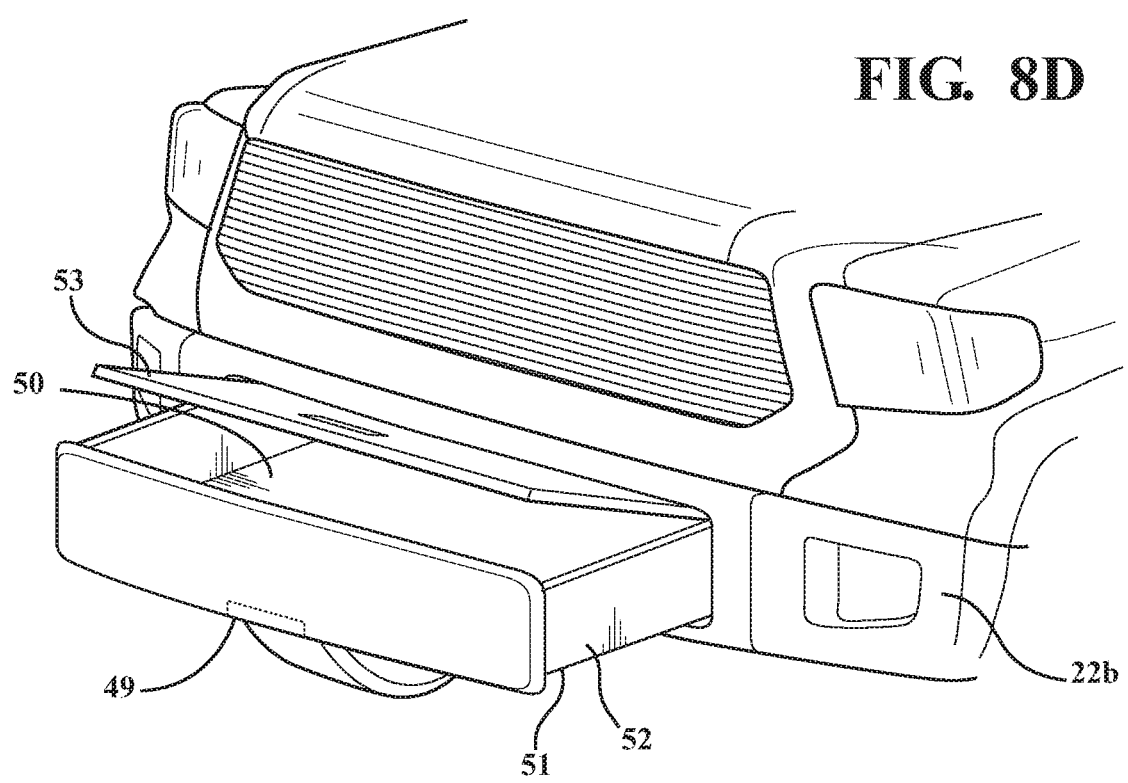
FIG. 8D is a schematic view similar to FIG. 8C, with the step platform lifted, showing the storage compartment.

FIG. 8C illustrates various aspects of a step platform 26 including a storage compartment 50 defined by a lower portion 51, side portions 52, and an upper portion 53, with the upper portion 53 configured to support a load, for example, a user or mechanic. The upper portion 53 may be movably coupled to the step platform assembly 25. The movable coupling may be, but is not limited to, a slide, hinge to rotate the upper portion 53, etc. The upper portion 53 may be uncoupled from the step platform assembly 25 so that it may be removed to access the storage compartment 50. A handle 48 may be located on the upper portion 53 to allow for an easier grip to move the upper portion 53. In other aspects, a latch 49 may be located on the underside of the step platform assembly 25. At least one of the latch 49 and handle 48 may each be configured to control a lock mechanism. In one aspect, the lock mechanism includes a locking member movably coupled to the latch 49, and a pin coupled to the vehicle 20. The pin may be coupled to the vehicle 20 so that the lock may contact the pin when the step platform assembly 25 is in first position. The lock and pin may selectively maintain the step platform assembly 25 in the first position. Another aspect includes an electromagnet 31 that maintains the step platform assembly 25 in at least one of the first position and second position. The electromagnet 31 may be controlled by the handle 48 or latch 49. FIG. 8D illustrates the upper portion 53 lifted to reveal the storage compartment 50. It should be understood that the lock mechanism is not limited to the lock and pin, and electromagnet 31 embodiments.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A step platform assembly for a front of a vehicle, the step platform assembly comprising:
    a guide rail system including a pair of guide rods configured to be coupled to a front frame of the vehicle; and
    a step platform coupled to the guide rods and defining a substantially planar surface configured to support a load and move in a horizontal direction between a first position under an engine compartment, and a second position extending from a front area of the vehicle;
    a movement-limiting system comprising a stopper component coupled to each guide rod that contacts a receiver component when the step platform extends to the second position; and
    an electromagnet coupled to one of the stopper component and the receiver component, and configured to selectively maintain the guide rail system in at least one of the first position and the second position.

2. The step platform assembly according to claim 1, wherein the guide rail system further comprises:
    a pair of beveled wheels coupling each guide rod to an opposing side of the front frame of the vehicle, wherein each guide rod is disposed between a respective pair of beveled wheels, with each guide rod being coupled to the step platform to provide coordinated movement between the first position and the second position.

3. The step platform assembly according to claim 1, wherein the guide rail system further comprises:
    a pair of linear action guides coupled to opposing sides of the front frame of the vehicle, wherein each guide rod fits with the linear action guides, with each guide rod being coupled to the step platform to provide coordinated movement between the first position and the second position.

4. The step platform assembly according to claim 1, wherein the guide rail system further comprises:
    a pair of linear bushings coupled to opposing sides of the front frame of the vehicle, wherein each guide rod is positioned within a respective linear bushing, with each guide rod being coupled to the step platform to provide coordinated movement between the first position and the second position.

5. The step platform assembly according to claim 1, further comprising:
an auxiliary platform defining a substantially planar surface and configured to support a load, wherein the auxiliary platform is movably coupled to a front of the step platform.

6. The step platform assembly according to claim 1, wherein the step platform comprises a lower portion, side portions, and an upper portion that cooperate to define a storage compartment, wherein the upper portion is movably coupled to provide access to the storage compartment and is configured to support a load.

7. The step platform assembly according to claim 1, further comprising:
a handle configured to control a locking mechanism, wherein the handle is located either on a front of the step platform or on an underside of the step platform.

8. The step platform assembly according to claim 1, further comprising:
a motor configured to extend and retract the step platform between the first and second positions.

9. A vehicle bumper assembly having an extendable step platform, the bumper assembly comprising:
an impact absorbing component;
a guide rail system including a pair of guide rods configured to be coupled to a front frame of a vehicle;
a step platform coupled to the guide rail system and defining a substantially planar surface configured to support a load and move in a horizontal direction between a first position under an engine compartment, and a second position extending a distance from a center section of a front of the vehicle;
a movement-limiting system comprising a stopper component coupled to each guide rod that contacts a receiver component when the step platform extends to the second position; and
an electromagnet that selectively maintains the guide rail system in at least one of the first position and the second position.

10. The vehicle bumper assembly according to claim 9, wherein the step platform comprises a lower portion, side portions, and an upper portion that cooperate to define a storage compartment, wherein the upper portion is movably coupled to provide access to the storage compartment and is configured to support a load.

11. The vehicle bumper assembly according to claim 9, further comprising:
a handle configured to control a locking mechanism, wherein the handle is located either on a front of the step platform or on an underside of the step platform.

12. The vehicle bumper assembly according to claim 9, wherein the guide rail system further comprises:
a pair of beveled wheels coupling each guide rod to an opposing side of the front frame of the vehicle, wherein each guide rod is disposed between a respective pair of beveled wheels, with each guide rod being coupled to the step platform to provide coordinated movement between the first position and the second position.

13. A vehicle having an extendable step platform providing improved access for maintenance, the vehicle comprising:
a vehicle frame;
an engine compartment;
an engine disposed in the engine compartment;
a vehicle bumper assembly having a guide rail system including a pair of guide rods and an extendable step platform configured to move in a horizontal direction between a first position adjacent the engine, and a second position extending from a front of the vehicle and configured to support a load of a user for accessing the engine compartment;
a movement-limiting system comprising a stopper component coupled to each guide rod that contacts a receiver component when the step platform extends to the second position;
a sensor configured to detect when the step platform is not in the first position; and
a controller configured to prevent vehicle movement when the sensor detects the step platform is not in the first position.

14. The vehicle according to claim 13,
wherein the sensor is configured
to provide at least one of a visual and audio notification when the step platform is not in the first position.

15. The vehicle according to claim 13, wherein the step platform comprises a lower portion, side portions, and an upper portion that cooperate to define a storage compartment, wherein the upper portion is movably coupled to provide access to the storage compartment and is configured to support a load.

16. The vehicle according to claim 13, wherein the guide rail system comprises:
a pair of beveled wheels coupling each guide rod to an opposing side of the front frame of the vehicle, wherein each guide rod is disposed between a respective pair of beveled wheels, with each guide rod being coupled to the step platform to provide coordinated movement between the first position and the second position.

* * * * *